United States Patent
Schietke

(10) Patent No.: US 8,909,477 B2
(45) Date of Patent: Dec. 9, 2014

(54) METHOD FOR AUTOMATICALLY STARTING A WIND TURBINE AND A WIND TURBINE FOR CARRYING OUT THE METHOD

(75) Inventor: Dirk Schietke, Rostock (DE)

(73) Assignee: Nordex Energy GmbH, Hamburg (DE)

( * ) Notice: Subject to any disclaimer, the term of this patent is extended or adjusted under 35 U.S.C. 154(b) by 549 days.

(21) Appl. No.: 13/287,284

(22) Filed: Nov. 2, 2011

(65) Prior Publication Data

US 2012/0104758 A1 May 3, 2012

(30) Foreign Application Priority Data

Nov. 2, 2010 (DE) .................. 10 2010 050 280

(51) Int. Cl.
*G06F 19/00* (2011.01)
*G01W 1/02* (2006.01)
*F03D 7/02* (2006.01)

(52) U.S. Cl.
CPC ............... *F03D 7/026* (2013.01); *Y02E 10/723* (2013.01)
USPC .......... 702/1; 290/44; 702/3; 702/58

(58) Field of Classification Search
CPC ... Y02E 10/722; Y02E 10/723; Y02E 10/725; Y02E 10/72; F03D 11/0025; F03D 7/026; F03D 11/00; F03D 9/002; F03D 11/0033; F03D 11/0091; F03D 7/0264; F03D 7/047; F05B 2260/20; F05B 2260/64; F05B 2260/80; F05B 2260/85; F05B 2270/303; F05B 2270/323; F05B 2240/96; F05B 2270/111; F05B 2270/8041; Y02T 50/675
USPC ........... 702/1, 3, 33, 130, 131, 132, 183, 184, 702/188, 58; 209/44, 55; 415/13, 17, 207; 416/39; 703/7; 290/44, 55
See application file for complete search history.

(56) References Cited

U.S. PATENT DOCUMENTS

| 7,098,550 | B2 | 8/2006 | Wobben | |
|---|---|---|---|---|
| 8,558,401 | B2 * | 10/2013 | Girardin | 290/44 |
| 2009/0110539 | A1 | 4/2009 | Uphues | |
| 2009/0232635 | A1 | 9/2009 | Menke | |
| 2010/0253079 | A1 | 10/2010 | Bolln et al. | |
| 2013/0161956 | A1 * | 6/2013 | Evans | 290/44 |

FOREIGN PATENT DOCUMENTS

DE 10 2008 037 096 A1 2/2010

* cited by examiner

*Primary Examiner* — John H Le
(74) *Attorney, Agent, or Firm* — Walter Ottesen P.A.

(57) ABSTRACT

A method automatically starts a wind turbine after an outage of an electrical supply grid. In the method, at least one measurement value is acquired as to a climatic variable in the wind turbine during the outage of the electrical supply grid. At least one acquired measurement value is recorded and a warning signal is generated prior to a starting of the wind turbine when the at least one recorded measurement value exceeds a predetermined maximum value or drops below a predetermined minimum value.

12 Claims, 3 Drawing Sheets

METHOD FOR AUTOMATICALLY STARTING A WIND TURBINE AND A WIND TURBINE FOR CARRYING OUT THE METHOD

CROSS REFERENCE TO RELATED APPLICATION

This application claims priority of German patent application no. 10 2010 050 280.4, filed Nov. 2, 2010, the entire content of which is incorporated herein by reference.

FIELD OF THE INVENTION

The present invention relates to a method for the automatic starting of a wind turbine after an outage of the electrical grid as well as a wind turbine which is appropriate for carrying out the method.

BACKGROUND OF THE INVENTION

United States patent application publication 2010/0253079 A1 discloses a wind turbine equipped with a heating arrangement. The wind turbine further has a control unit which has a temperature sensor. Additionally, a pre-warming module equipped with a thermostatic switch is provided which monitors the temperature of a component and is actuated when a limit is reached. The control unit actuates the heating arrangement until the thermostatic switch is engaged and the output unit generates an enable signal for the starting of the wind turbine.

From United States patent application publication 2009/0232635 A1 there is known an independent sensor system for a wind turbine which transmits wirelessly measured parameter values to a control. The sensor system has an independent energy supply and transmits the measured values to the control of the wind turbine.

DE 10 2008 037 096 A1 discloses a temperature measurement of a wind turbine. The temperature measurement is configured to measure the temperature on at least one point of the rotor and/or on at least one point of the support structure. The measured values are taken into account for the control and monitoring of the system.

U.S. Pat. No. 7,098,550 B2 discloses a method for the control of a wind turbine in which the temperature of the generator and the temperature of the air in the surrounding region of the wind turbine are measured and the generator is heated when the temperature of the generator is below the temperature of the ambient air.

Wind turbines are also used in extreme climate conditions and are generally remotely monitored. Certain components, such as, for example, electronic devices in the wind turbine have a limited storage temperature range which, as far as possible, should neither be exceeded nor should there be a drop therebelow. Expediently, this is done via climate control, that is, a heating or cooling of the corresponding components in the wind turbine. In the case of an outage of the electrical grid during which the wind turbine is without an external power supply for a particular period of time, it cannot be ensured reliably that the climatizing of the components still takes place. For this reason, it is necessary to initially test the critical components for their operability during a new start of the system. Such testing is laborious and time-intensive.

SUMMARY OF THE INVENTION

It is an object of the invention to provide a method for starting a wind turbine as well as a wind turbine for executing such a method, in which, also in the case of an outage of the electrical grid, it can be tested in a simple manner whether special climate conditions, which may lead to the damaging of components of the wind turbine, were present.

The method of the invention is for automatically starting a wind turbine after an outage of an electrical supply grid. The method includes the steps of: acquiring at least one measurement value as to a climatic variable in the wind turbine during the outage of the electrical supply grid; recording the at least one acquired measurement value; and, generating a warning signal prior to a starting of the wind turbine when the at least one recorded measurement value exceeds a predetermined maximum value or drops below a predetermined minimum value.

Thus, the method according to the invention serves to automatically start a wind turbine after an outage of the electrical grid. Depending on the location of the wind turbine and the cause of the outage of the electrical grid, such an outage can last several hours to days. According to the invention, at least one measurement value as to climate conditions in the interior of the wind turbine, for example, in a tower and/or a nacelle, is detected and recorded during the outage of the electrical grid. Hereby, at least one measurement value is captured and at least one of the captured measurement values is recorded. In the case where only one measurement value is captured, this value is recorded. Prior to starting the wind turbine, a warning signal is generated when the recorded measurement value(s) is/are greater than a predetermined maximum value or less than a predetermined minimum value. In the method according to the invention, the climate conditions are captured and recorded. The recorded measurement values enable a testing before a start of whether the climate conditions in the interior of the wind turbine during the outage were such that there did not exist any too extreme conditions. When, on the basis of the captured measurement results, it is determined that there were climate conditions during the outage of the electrical grid which were outside of an interval of acceptable values in the wind turbine defined by a predetermined maximum and minimum value, a corresponding warning signal is generated.

In a preferred embodiment of the method, the measurement values are captured in close spacial proximity to a component of the wind turbine, and the predetermined maximum or minimum values correspond to limit values for acceptable storage conditions of the component. In this way, it can be determined with respect to a climate controlled component whether the acceptable storage conditions were or were not maintained during the outage of the grid.

In a preferred embodiment, not only measurement values are recorded but also the time at which the measurement values were taken. Thus, the time duration in which particular measurement values were present can also be evaluated.

In another preferred embodiment of the method according to the invention, the warning signal is generated when the measurement values are above the maximum value or below the minimum value for a predetermined period of time. Thus, in this embodiment, a warning signal is not generated when the climate conditions for the component were unfavorable for only a short period of time, that is, for a time span which is non-critical for the component. Only when this condition persisted longer and corresponds at least to a predetermined period of time, a warning signal is generated which is transmitted to the control and/or operating control of the wind turbine.

In a practical further embodiment of the method according to the invention, when a warning signal was generated, a start of the wind turbine is executed only after a functionality test of the component whose acceptable storage conditions were not maintained during the grid outage. In this way, it is not necessary to perform a functionality test for all critical components but the functionality tests can be limited to those components whose acceptable storage conditions were not maintained.

In the method according to the invention, the monitored climate conditions can, for example, be the temperature, humidity, or the air pressure. Combinations of these variables can also be monitored.

It is also an object of the invention to provide a wind turbine for carrying out the method of the invention.

The wind turbine of the invention includes a sensor for the capturing of a climate variable in the interior of the wind turbine. Further, a recording unit is provided which records measurement values of the sensor captured independently of the electrical grid. The wind turbine further has a control unit, which prior to a starting of the wind turbine, evaluates the recorded measurement value(s) of the recording unit as to whether recorded measurement values were outside a predetermined interval of acceptable values during the outage of the electrical grid, that is to say whether a predetermined maximum value was exceeded or there was a drop below a predetermined minimum value. When the recorded values are outside the interval of acceptable values, a warning signal is generated. In the wind turbine according to the invention, it is ensured that the climate conditions for individual components are also monitored during an outage of the electrical grid, and when the acceptable conditions are not maintained, a warning signal is generated before the start of the wind turbine.

In a practical embodiment, the recording unit has a power supply in order to be able to record the captured sensor values during an outage of the external power supply of the wind turbine. The power supply is preferably configured such that it can record measurement values from the sensors for several days.

In an alternative embodiment, a chemical and/or mechanical capturing of the measurement values takes place which can be evaluated electrically and/or electronically by the recording unit after the grid is restored. Thus, a separate power supply for the recording unit is not necessary.

In a further preferred embodiment, the sensor is arranged in spacial proximity of a component of the wind turbine and the predetermined maximum or minimum values correspond to limit values for acceptable storage conditions of the component.

In a preferred embodiment, the sensor measures the temperature or the humidity. It can also be provided that the sensor measures an air pressure. With components whose climate conditions are critical, usually special precautions are taken in order to control the climate conditions of the component. Such a control is dependent on the external voltage supply so that non-controlled critical conditions for the component can occur when the external voltage supply fails.

In a preferred embodiment of the wind turbine, the warning signal is only generated when the measured and recorded sensor values are outside of the predetermined maximum and minimum values for acceptable storage conditions of the component for a predetermined amount of time. In this way, it is ensured that exceeding the interval of acceptable values for a short period of time does not lead to a warning signal.

In a preferred embodiment of the wind turbine according to the invention, an automatic starting of the system is prevented when a warning signal is present.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
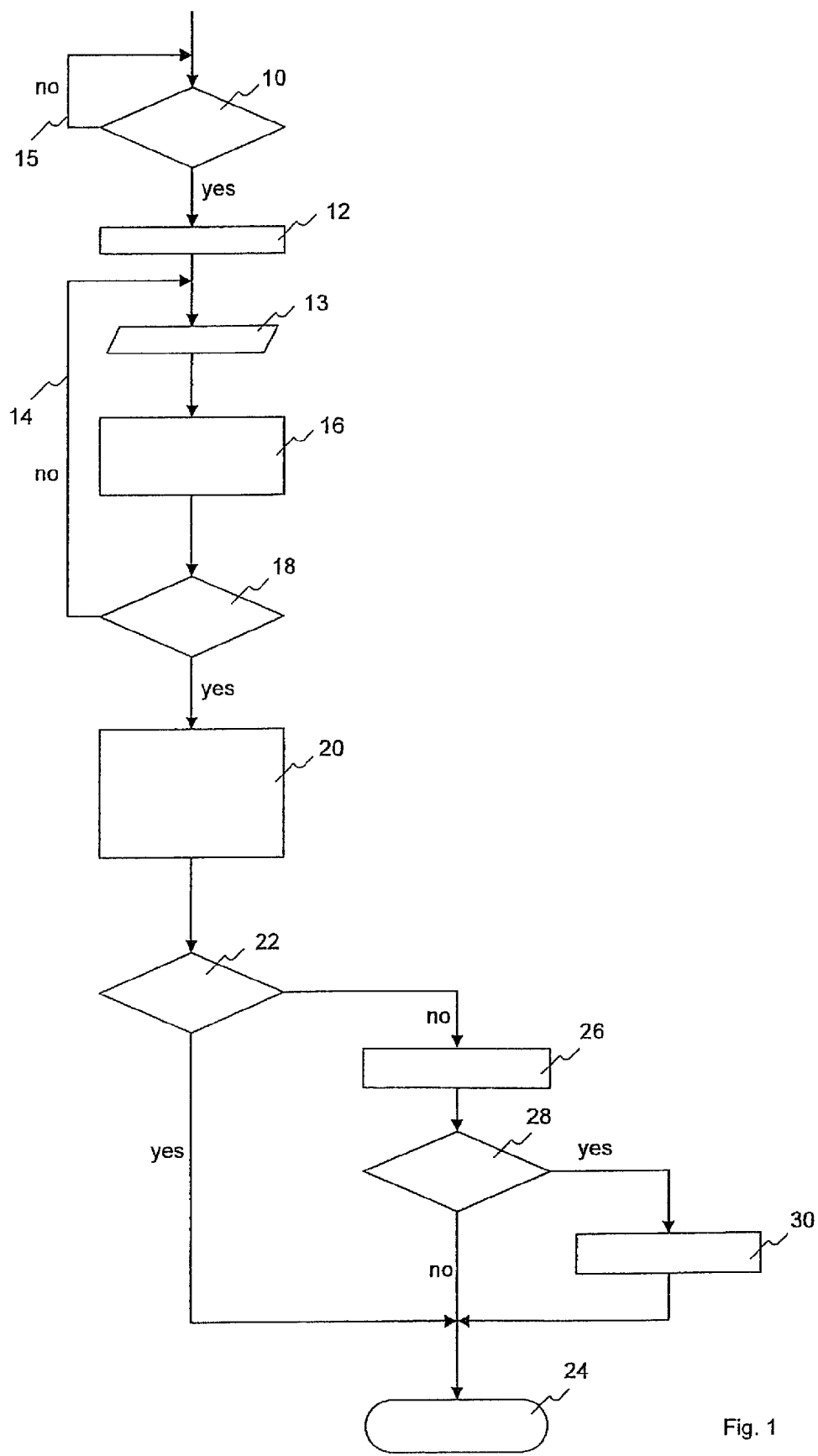
FIG. 1 is a flow chart showing an embodiment of the method according to the invention.

The invention will be described more closely with reference to the flow diagram of FIG. 1. In a first step 10 of the method, a determination is made as to whether a grid outage is present at the wind turbine. When there is a grid outage, an initialization of the measurement value acquisition is carried out in step 12. Hereby, for example, stored values and the like can be deleted from the data storage of the measurement value acquisition so that in subsequent step 13 of the measurement value acquisition, new measurement values can be acquired and stored in step 16. The storing of the measurement values in step 16 can be done for every measurement value. It may also be the case that, for example, only the largest or smallest measurement value is stored. In step 18, a check is made as to whether the grid is back up. When the grid outage persists, the measurement value acquisition in method step 13 as well as the measurement value storage in method step 16 are continued via the loop 14 until the grid outage is over and the grid is up again.

However, if there is no grid outage during the inquiry of step 10, then no initializing of the measurement value acquisition will take place in step 15.

In the present embodiment, the condition is provided that the temperature in a switch and control cabinet of the wind turbine is neither too high nor too low. A temperature in the switch and control cabinet is recorded via the loop 14 until the grid outage is over and the grid is up again.

After the grid returned, the measurement values acquired in step 13 and stored in the data storage in step 16 are read out by the control of the wind turbine in method step 20. The general conditions for the start of the wind turbine are also tested in step 20, for example, whether sufficient wind is present to start the wind turbine anew.

If the general starting conditions for the wind turbine are present in method step 20, then a check is made in step 22 as to whether the maximum and minimum values determined in step 16 lie within an acceptable range. When the acquired maximum and minimum values are within the acceptable range, the enablement to start for the wind turbine is given in step 24.

If it was determined in step 22 that the acquired minimum value or the acquired maximum value lies outside the acceptable range, then a warning signal is generated in a bifurcation to method step 26 and a check of any components at risk is initiated. Depending on the component, the testing can be performed automatically by the control itself or via a remote monitoring. If necessary, the testing takes place by a service technician on site.

In the inquiry 28, in dependence on the criterion whether or not the component is defective, it is decided, whether any repair or exchange of the defective component must be performed in step 30 or whether a direct start enablement can be given in step 24.

It becomes clear from the aforementioned embodiment that, in the method according to the invention, the different temperature values in the switch cabinet are measured for the time of the grid outage. These are evaluated prior to a restarting of the system. While the wind turbine is supplied with external energy, a recording of the acquired measurement values can be omitted; if necessary, a temperature control in the switch cabinet is effected via a heater.

Alternatively, it is also possible to continually record the temperature values, that is, also at times when an external power supply is present. In this embodiment, the evaluation is performed for the time interval in which the grid outage was present.

Figure 2:
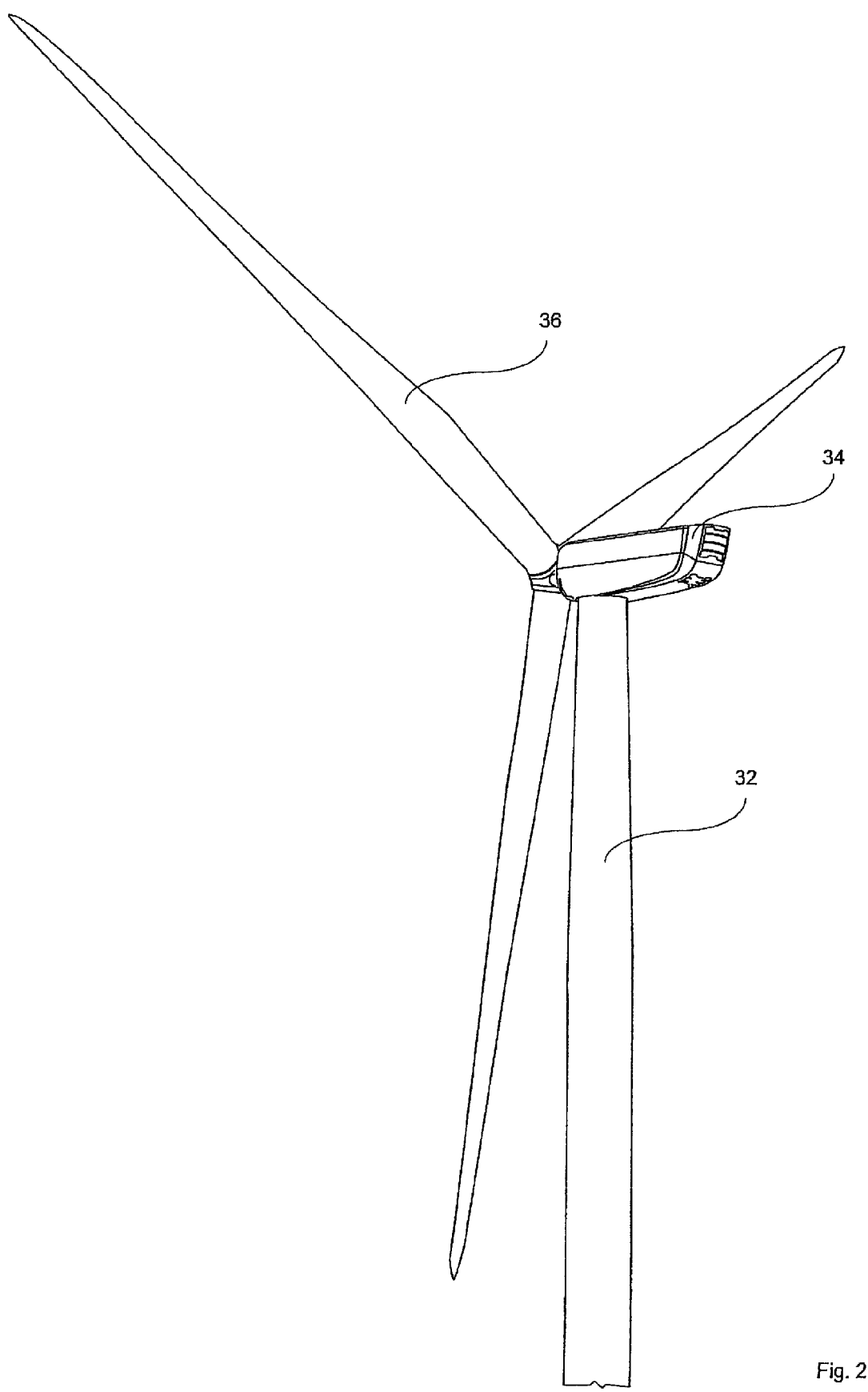
FIG. 2 is a perspective view of a wind turbine according to the invention.

FIG. 2 is a schematic perspective view of the wind turbine having a tower 32, a nacelle 34 and three rotor blades 36. The nacelle 34 is rotatably supported on the tower 32 and can be so aligned in correspondence to the wind direction that the rotor blades 36 are directed into the wind on the end of the nacelle 34 facing toward the wind.

Figure 3:
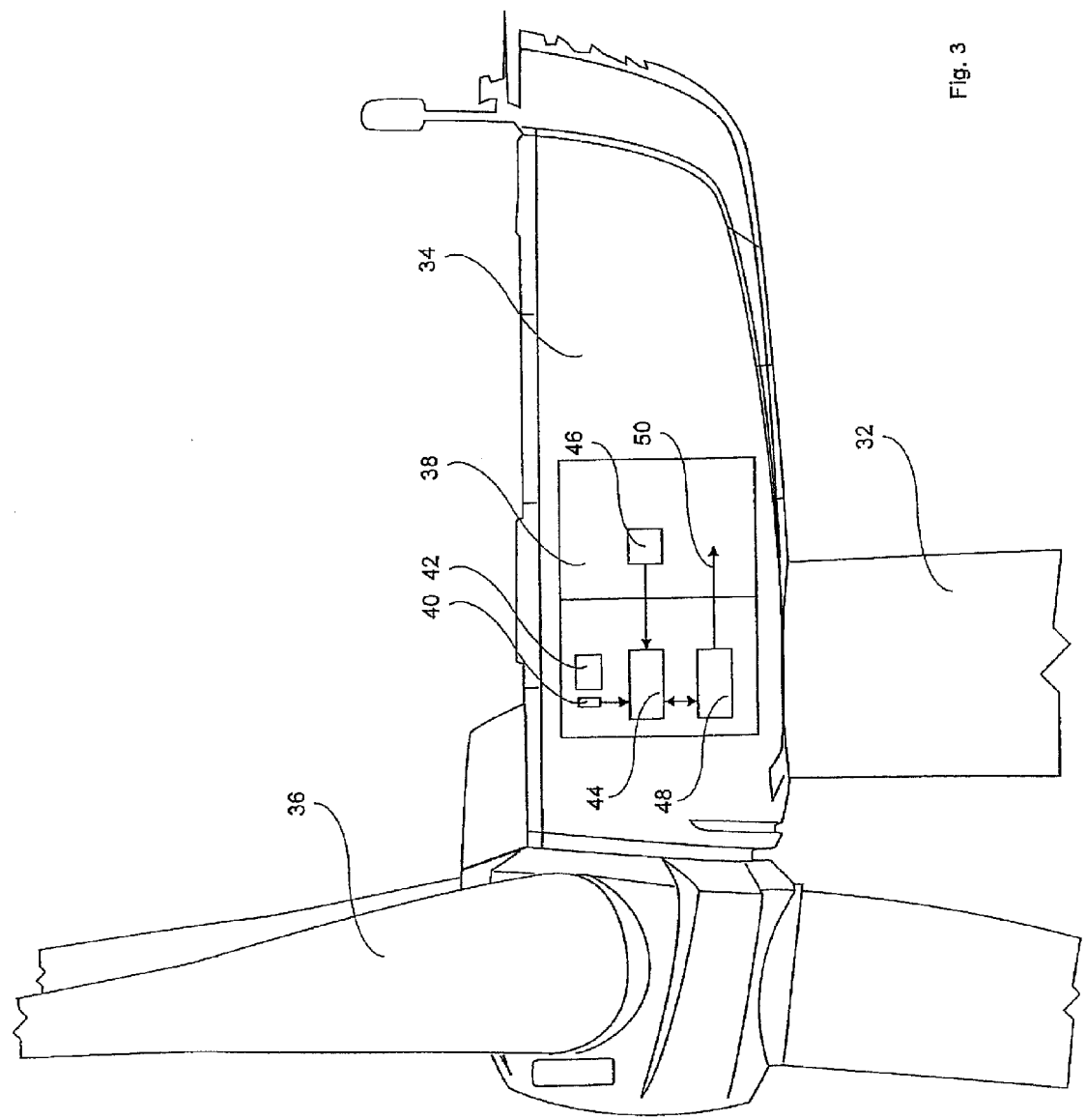
FIG. 3 is a schematic of the nacelle of the wind turbine of FIG. 2.

FIG. 3 shows, in an enlarged view, the nacelle 34 together with a schematic of the switch cabinet 38. The switch cabinet 38 includes a sensor 40 for detecting a climatic variable in the interior of the nacelle 34. The sensor 40 is mounted spatially next to a component 42 to be monitored. The measurement data, which are detected by the sensor 40, are transmitted to a recording unit 44. The recording unit 44 has a separate current supply 46 independent of the electrical grid. The current supply 46 permits recordation of the measurement data even during an outage of the electrical grid.

In addition, a control unit 48 has access to the measurement values, which are stored in the recording unit 44, in order to evaluate the measurement values, which are recorded during an outage of the electrical grid. These measurement values are evaluated to determine whether at least one of the measurement values, from the time span of the outage, has exceeded a predetermined maximum value or has dropped below a predetermined minimum value. In this case, the control unit 48 generates a warning signal 50, with which it is indicated that, during the outage of the electrical grid, climatic conditions were present for the component 42 outside of the interval defined by the predetermined maximum and minimum values.

It is understood that the foregoing description is that of the preferred embodiments of the invention and that various changes and modifications may be made thereto without departing from the spirit and scope of the invention as defined in the appended claims.

What is claimed is:

1. A method for automatically starting a wind turbine by a processor after an outage of an electrical supply grid, comprising the steps of:
    acquiring at least one measurement value as to a climatic variable in the wind turbine during the outage of the electrical supply grid;
    recording said at least one acquired measurement value; and,
    generating a warning signal prior to a starting of the wind turbine when said at least one recorded measurement value exceeds a predetermined maximum value or drops below a predetermined minimum value.

2. The method of claim 1, wherein said at least one measurement value is acquired in spatial proximity to a component of the wind turbine and the predetermined maximum and/or minimum values correspond to limit values for permissible storage conditions of the component.

3. The method of claim 2, wherein, when a warning signal was generated, a starting of the wind turbine is initiated only after a functionality check of the component whose prescribed storage conditions were not maintained.

4. The method of claim 1, wherein the recording of said at least one acquired measurement value also includes the time of acquisition.

5. The method of claim 4, wherein a warning signal is generated when recorded measurement values are above the maximum value and/or below the minimum value for a predetermined time duration.

6. A wind turbine comprising:
    a sensor for detecting a climatic variable in the interior of the wind turbine;
    a recording unit which records at least one measurement value of said sensor; and,
    a control unit which, prior to a starting of the wind turbine, evaluates the at least one recorded measurement value of said recording unit in such a manner that, when the at least one recorded measurement value exceeds a predetermined maximum value or is below a predetermined minimum value during an outage of the electrical supply grid, the control unit generates a warning signal.

7. The wind turbine of claim 6, wherein said recording unit has a power supply in order to record the measured sensor values during an outage of the external power supply of the wind turbine.

8. The wind turbine of claim 6, wherein said recording unit acquires measurement values chemically and/or mechanically and acquired measurement values are read out electrically and/or electronically after the electrical grid is restored.

9. The wind turbine of claim 6, wherein said sensor is arranged in spatial proximity to a component of the wind turbine and the predetermined maximum and/or minimum value corresponds to the permissible storage conditions of said component.

10. The wind turbine of claim 6, wherein said sensor detects a temperature and/or humidity and/or air pressure.

11. The wind turbine of claim 6, wherein a warning signal is only generated when the acquired measurement values exceed the predetermined maximum value or fall below the predetermined minimum value for a predetermined time duration.

12. The wind turbine of claim 6, wherein an automatic system start is prevented when a warning signal was generated.

* * * * *